Patented July 18, 1950

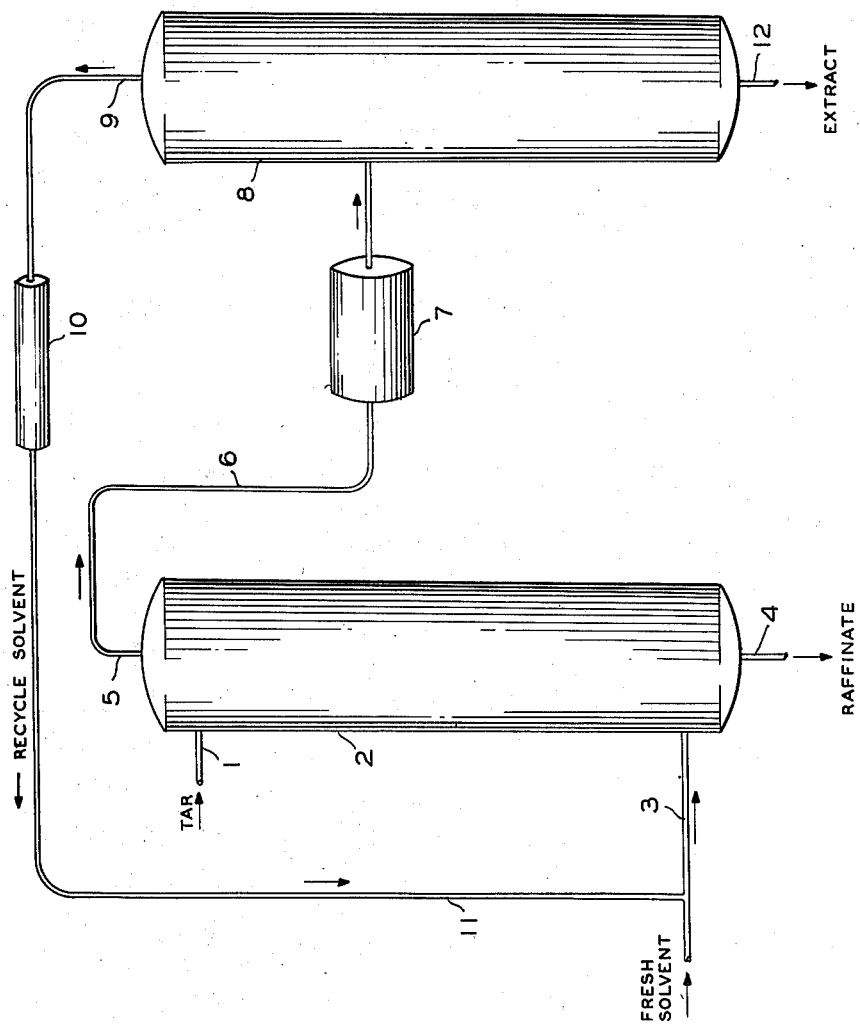

2,515,928

UNITED STATES PATENT OFFICE 2,515,928

SULFUR-CONTAINING LIQUIDS

Sigmund J. Lukasiewicz and William I. Denton, Woodbury, N. J., assignors to Socony-Vacuum Oil Company, Incorporated, a corporation of New York Application March 13, 1947, Serial No. 734,310

19 Claims. (Cl. 260—329)

This invention relates to sulfur-containing liquids obtained from the tarry product resulting in the reaction of sulfur with an aliphatic hydrocarbon. More particularly, the invention is concerned with sulfur-containing liquids obtained upon selective solvent-extraction of said tarry product.

In the reaction between sulfur and an aliphatic hydrocarbon at elevated temperatures under conditions hereinafter described, the formation of a tar is encountered. The tar, so produced, has heretofore been considered to be of little use and generally has been obtained as an undesirable by-product in methods directed to the manufacture of other chemicals, notably, sulfur-containing organic compounds. Attempts to separate components from the tarry product produced have hitherto been unsuccessful inasmuch as the tars, which are generally dark-colored liquids, tend to decompose at moderately elevated temperatures with the evolution of hydrogen sulfide and at still higher temperatures with the evolution of yellow sulfur vapors. Thus, efforts to distill the aforementioned tars at atmospheric pressure have led to their decomposition and consequently have been of little avail in isolating useful compounds therefrom. Some success has been attained in isolating compounds of chemical interest from the above described tars by carrying out the distillation thereof under greatly reduced pressures, that is, by a so-called vacuum distillation procedure. This operation, however, yields materials which are decomposition products rather than those compounds initially present in the tar.

It has now been discovered that valuable sulfur-containing compounds initially present in tars produced by reacting separately preheated aliphatic hydrocarbons with separately preheated sulfur at elevated temperatures can be obtained by selective extraction with low boiling organic solvents which are at least partially immiscible with said tars.

Accordingly, it is an object of the present invention to provide a process for removing the sulfur compounds initially present in the tarry products resulting from the reaction of preheated aliphatic hydrocarbon with preheated sulfur. Another object is to provide an inexpensive source of valuable sulfur compounds useful in organic syntheses, as fuel oil additives, in the compounding of rubber and various other applications. A further object is the provision of a process for obtaining sulfur compounds from said tars by a commercially feasible method which can be carried out at a temperature below the decomposition point of said compounds. A more specific object is to provide a process for obtaining valuable sulfur-containing compounds from the tars produced by reacting a preheated aliphatic hydrocarbon of from four to six carbon atoms with preheated sulfur at an elevated temperature. A very important object is to afford a process capable of carrying out the above objects by isolating sulfur-containing compounds from the tar produced by reacting separately preheated aliphatic hydrocarbons with separately preheated sulfur at elevated temperatures. Other objects and advantages of the present invention will become apparent to those skilled in the art from the following description.

Broadly stated, the present invention provides a process for the selective solvent extraction of valuable sulfur-containing derivatives from the tar produced by the process of separately preheating sulfur and an aliphatic hydrocarbon to temperatures such that combining the sulfur and hydrocarbon material will give a mixture having a temperature in excess of about 850° F., mixing the preheated sulfur and preheated hydrocarbon material, maintaining the temperature of the mixture at a temperature in excess of about 850° F. for a period of time sufficient to produce the desired products, and reducing the temperature of the mixture to less than about 850° F.

The extraction process is carried out by contacting the tarry materials produced as described above with a suitable organic solvent, separating the resultant extract and raffinate phases, and stripping off the solvent from the extract phase. The solvent so removed may, if desired, be recycled and contacted with fresh tarry product, thus affording a continuous solvent-extraction operation. In some instances, as hereinafter described, it may be found desirable to refine the extract further by fractionation under high vacuum.

The tarry products which are selectively solvent-extracted in accordance with the present invention are those resulting from the reaction at elevated temperatures of a separately preheated aliphatic hydrocarbon and separately preheated sulfur. Generally, the sulfur and hydrocarbon material will be separately preheated to such a temperature that upon combining, a mixture having a temperature in excess of about 850° F. is obtained. The temperature of the hydrocarbon-sulfur mixture is maintained in excess of about 850° F. for a period of time of at least 0.01 second and then the temperature is reduced to less than about 850° F. Upon contacting preheated sulfur and preheated aliphatic hydrocarbon at short intervals of time at relatively elevated temperatures above about 850° F., it has been found that one of the resulting products is a tar. It is this material which constitutes the source of sulfur-containing compounds obtained in accordance with the method described herein by selective solvent extraction. In addition to the tarry product obtained upon reacting sulfur with aliphatic hydrocarbon under the above conditions, various other materials are obtained. The nature of these other products will largely depend on the particular aliphatic hydrocarbon employed in the initial reaction. Thus, when four-carbon atom aliphatic hydrocarbons, such as normal butane, normal butenes, and butadienes, are employed, the resulting products include, in addition to the above described tar, thiophene, hydrogen sulfide and small amounts of carbon disulfide. When the aliphatic hydrocarbon employed is a five or six-carbon atom compound, such as the pentanes, pentenes, pentadienes, hexanes, hexenes and hexadienes or mixtures thereof, the resulting products include the above mentioned tarry product, and alkyl derivatives of thiophene, such as the methyl, dimethyl and ethyl derivatives. The above processes constitute excellent means for manufacturing thiophene and alkyl thiophene derivatives and the tar derived from said processes constitutes a preferred source of sulfur-containing compounds obtained by the method of this invention.

The processes for preparing tars from sulfur and the aforementioned four to six aliphatic hydrocarbons are described at length in U. S. Patents 2,450,636 and 2,450,659. For convenience herein, however, the following is offered as a brief description of the tars produced and processes for their preparation.

Thiophene and a tarry product, which will be referred to as thiophene tar, are prepared by separately preheating sulfur and one or more normal aliphatic hydrocarbons selected from the group consisting of normal butane, normal butenes, and butadienes to temperatures such that combining the sulfur and the hydrocarbon material will give a mixture having a temperature in excess of about 850° F., mixing the preheated sulfur and preheated hydrocarbon mixture, maintaining the temperature of the mixture at a temperature in excess of about 850° F. for a period of time of at least 0.01 second, and reducing the temperature of the mixture to less than about 850° F. Along with thiophene tar and thiophene, hydrogen sulfide and small amounts of carbon disulfide are also formed in the process. Thiophene tar and alkyl derivatives of thiophene are also obtained by using an aliphatic hydrocarbon containing 5 or 6 carbon atoms and containing at least 4 carbon atoms in a straight chain, instead of a 4-carbon hydrocarbon in the foregoing process. Accordingly, the hydrocarbons used in preparing thiophene tars are normal butane, normal butenes, butadienes, pentanes, pentenes, pentadienes, hexanes, hexenes and hexadienes, all having at least 4 carbon atoms in a chain, or mixtures thereof. It will be understood that thiophene tar and thiophene are obtained from the aforesaid 4-carbon hydrocarbons and thiophene tars or alkylated thiophene tars and alkyl derivatives of thiophene are obtained from the aforesaid 5 and 6-carbon hydrocarbons. As stated herein, therefore, the term "thiophene tars" is used generically to describe those tars which are formed with thiophene and those which are formed with alkyl derivatives thereof, such as the methyl and ethyl derivatives.

While relatively large quantities of sulfur are employed in preparing the tars constituting the source of sulfur-containing compounds extracted in accordance with the present invention, nevertheless, sulfur is one of the least expensive and non-critical chemical reagents. It has been found, in the operation of the processes of making the tar, that the relative proportions of sulfur and hydrocarbon material in the charge may be varied over wide limits. Too much sulfur, however, results in poor efficiency in sulfur utilization per pass and favors the complete sulfurization of hydrocarbon material to carbon disulfide. Yet, too low a proportion of sulfur lowers the conversion per pass and the ultimate yield by increasing the overall thermal degradation of hydrocarbon material. Generally speaking, best results are obtained using a weight ratio of sulfur to hydrocarbon material varying between about 0.5 and about 4.0, although when butenes, butadienes, pentenes, pentadienes, hexenes, or hexadienes constitute the bulk of the hydrocarbon material in the charge, the lower limit of the weight ratio may be lower than 0.5. It should be observed, however, that for economical operation of the process, it is preferred not to use a hydrocarbon charge consisting predominantly of aliphatic hydrocarbons having two or more double bonds present, such as butadienes, pentadienes, hexadienes, etc., because of the tendency of these compounds to polymerize under the conditions of the process.

The selectivity of the reaction involved in the process for the preparation of thiophene tars and thiophenes depends primarily upon two variables; namely, the reaction temperature at which the normal aliphatic hydrocarbon or hydrocarbons are contacted with sulfur, and the reaction time or the time during which contact between the reactants is maintained at the reaction temperature.

The limits of operating temperature are fixed between kinetics of the desired reaction and the kinetics of possible side reactions. It has been found in this connection that the reaction temperature may vary between about 850° F. and about 1400° F., depending upon the number of carbon atoms present in the aliphatic hydrocarbon reactant. When butane is the predominant hydrocarbon reactant in the charge, the reaction temperature will preferably lie between about 1000° F. and about 1200° F.; when butenes and butadienes are the predominant hydrocarbon reactants in the charge, the temperature will preferably be between about 900° F. and about 1100° F. Likewise, with the five and six-carbon hydrocarbon reactants mentioned hereinabove, the reaction temperature will preferably be between about 900° F. and about 1100° F. Below the lower limit of the temperature range (about 850° F.), the reaction is so slow as to require a large through-put of sulfur and a higher ratio of hydrocarbon recycle for a fixed amount of end product, therefore detracting from the economics of the operation. About the upper limit of the temperature range, which, as indicated above, varies with the number of carbon atoms in the hydrocarbon reactant, the secondary reaction of degradation of the hydrocarbon material in the charge takes precedence, thereby decreasing the yield of desired product. In addition to this, high temperatures favor the formation of carbon disulfide. It must be noted also that at these high temperatures, corrosion problems are at a maximum, corrosion increasing perceptibly with increasing temperatures.

It has also been found that the optimum reaction time depends upon the temperature employed. In general, other variables remaining constant, the lower the temperature, the longer the reaction time required. The reaction or contact time and the reaction temperature are somewhat fixed, one in relation to the other, by the degree of degradation of the hydrocarbon material in the charge and by the extent of formation of undesirable products which may be tolerated. Thus, too long a contact time at high temperature results in severe cracking of the hydrocarbon material in the charge. The reaction proceeds with extreme speed, the only limitation apparently being the rapidity with which heat can be supplied to the reaction mixture. The reaction is highly endothermic, requiring, by experimental measurement, approximately 28,000 calories per gram molecular weight of thiophene produced from normal butane. The lower limit of the range of reaction time is fixed, therefore, by the engineering problem of heat transfer and by mechanical limitations, such as allowable pressure drop across the reactor. Relatively long reaction times at temperatures in the neighborhood of the lower limit of the temperature range result in lower yields of thiophene and increased yields of the thiophene tar. Too short a reaction time at temperatures in the neighborhood of the lower limit of the temperature range results in insufficient reaction. Accordingly, it has been found that for best results, the time of reaction is fixed by the reaction temperature.

In view of the foregoing, the criteria to be used in determining optimum operating temperatures, within the range of 850° F. to 1400° F., and reaction times depend on the degree of conversion desired commensurate with operating costs such as heat input and equipment costs, bearing in mind that within the limits, the shorter the reaction time and the higher the temperature, the larger the amount of end product which can be realized from a unit of given size per day.

It is recognized that the relationship between the temperature of reaction and reaction time described above applies to numerous other chemical reactions. In the instant reaction, however, it has been established that thiophene or derivatives thereof, along with the thiophene tars, may be produced by reacting sulfur and aliphatic hydrocarbons of from 4 to 6 carbon atoms, having at least 4 carbon atoms in a chain, at a temperature between about 850° F. and about 1400° F. for a period of time selected to minimize the yields of secondary reaction products, such as carbon disulfide, coke-like materials, etc., at the selected temperature. Under such conditions, when operating continuously with a reactor coil of suitable size and at a practical charge rate, it has been found that the lowest practical limit of the time of reaction is of the order of 0.01 second at about 1400° F. The upper practical limit of the reaction time, other variables remaining constant, will correspond to the lower limit of the reaction temperature and may be of the order of several seconds.

Separate preheating of the hydrocarbon reactant and sulfur and quenching of the reaction mixture are necessary for achieving the somewhat close control of the reaction time at a given reaction temperature. This is very important in the specific reaction producing thiophene and thiophene tars. It is suspected that a number of reactions occur in the reaction between the hydrocarbon reactant and sulfur. In this connection, the following should be noted: cracking of the hydrocarbon reactant, destroying the 4-carbon atom chain structure, essential for the formation of thiophene and alkyl derivatives thereof; formation of thiophene tars high in sulfur; and formation of carbon disulfide. These reactions compete with one another. It has been established that the rates of the formation of carbon disulfide and the lighter hydrocarbons are somewhat slower than those required for the formation of thiophene and thiophene tars. Accordingly, a proper control of the reaction time at a given reaction temperature achieved by separate preheating, mixing, heating at a given temperature for an increasing period of time, and quenching is necessary to produce high yields of thiophene and thiophene tars with limited yields of carbon disulfide, coke-like materials and fixed gases due to a limited decomposition of the hydrocarbon reactant. The rate of the reaction producing thiophene tars is fairly close to that required for the formation of thiophene, and the yields of thiophene tars and of thiophene are approximately the same.

In carrying out the process for preparing thiophene tars, it is essential to preheat the reactants separately. Heating the hydrocarbon material and sulfur together is undesirable, since heavy tars are thereby produced and these are subsequently cracked in the reactor, causing undue coke formation. Tests have shown that when the reactants are heated together up to temperatures within the aforementioned reaction temperature ranges, tar formation is favored, as is subsequent cracking thereof, with the result that the reaction zone is eventually filled with a heavy carbonaceous deposit. Therefore, it is essential to preheat each of the reactants separately, that is, the aliphatic hydrocarbon or mixture of such hydrocarbons and sulfur, to such temperatures that when they are brought together under proper conditions of flow, a temperature falling within the reaction temperature range is achieved before effecting contact between them. In practice, this is ordinarily effected by separately preheating each of the reactants to temperatures within the reaction temperature range.

After the separately preheated hydrocarbon reactant and sulfur are mixed and allowed to react for the reaction time indicated by the operating temperature, the temperature of the reaction mixture is immediately lowered to below about 850° F., in practice appreciably below 850° F., in order to avoid over-reaction in the system after leaving the reactor. This may be suitably accomplished by spraying the effluent of the reactor with a liquid.

The reaction of preparing thiophene tars is preferably effected at atmospheric pressure or under sufficient pressure to cause the flow of the reactants through the reactor and auxiliary system under the desired reaction conditions. Tests have shown that the yield per pass and ultimate yield of thiophene and thiophene tars decrease with increase in pressure. However, even at appreciable pressures, thiophene and thiophene tars are, nevertheless, produced in substantial amounts. It has been found that best results are obtained when turbulent flow is maintained through the reactor, suitably, a conventional coil-type pipe reactor. With this type of reactor the desired turbulent flow may be achieved with a pressure drop of about 1 to 20 pounds across the coil, depending on the size of the pipe and the length of the coil. Turbulent flow promotes heat transfer and assures good mixing of the reacting vapors of sulfur and aliphatic hydrocarbon reactant.

Solvent extraction of the above described tars may be carried out in any suitable contacting vessel with a low boiling organic solvent having a selective extractive action for said tars and which is at least partially immiscible therewith. The two immiscible phases, extract and raffinate, resulting from said solvent treatment are then separated. Solvent is removed from the extract phase suitably by fractionation under reduced pressure to yield the desirable sulfur-containing compounds of this invention. The product so obtained contains the sulfur compounds originally present in the tar as compared with the lower molecular weight product obtained by destructive distillation procedure. The resulting extract product is further characterized by being more fluid, easier to handle and more homogeneous than the original tar.

A solvent suitable for use in the present invention in extracting the tar resulting from the reaction at elevated temperatures of sulfur and an aliphatic hydrocarbon as described above should be partially immiscible with said tar, permit a clean break between the resultant phases in a reasonable length of time and have a relatively low boiling point, generally below about 130° C. and preferably below 100° C. to insure easy recovery of the solvent without encountering extensive decomposition of the extract. As was pointed out above, the resulting sulfur-containing extracts are extremely sensitive to heat, and decomposition thereof ensues if the temperature is raised too high while recovering the solvent. Representative of the solvents which may be employed herein are petroleum ether, glacial acetic acid, nitromethane, methanol, n-butane, n-pentane, isopropyl alcohol, acetonitrile, n-hexane, n-heptane, iso-octane, propionitrile, ethyl alcohol, and the like. Of this group, aliphatic alcohols of from 1 to 4 carbon atoms, petroleum ether, aliphatic paraffinic hydrocarbons of from 3 to 8 carbon atoms and alphatic nitriles of from 2 to 4 carbon atoms are to be preferred. Acetonitrile and methanol, in particular, have proven to be effective solvents. Moreover, the low boiling point of these compounds makes the subsequent stripping operation simple, while the tendency of acetonitrile to form an azeotrope with water is highly desirable since the extract obtained will be in an anhydrous state.

The extractive properties of the above solvents may be modified in several ways. All of the above solvents are effective at room temperature. However, an increase in temperature appreciably reduces the selectivity of a solvent such as nitromethane so that this material is of little value when the extraction is carried out at an elevated temperature. On the other hand, the yield of desired sulfur-containing liquid obtained by extraction of the aforementioned tar with petroleum ether is substantially improved by an increase in temperature. Carrying out the extraction, at a temperature below room temperature, makes practical the use of such materials as tertiary butyl mercaptan, dioxane, acetone, and diethyl carbonate, which generally are too miscible with the tar at room temperature to afford a selective extraction thereof. The properties of the particular solvent employed may be regulated to a desired degree by using a combination of a material which generally does not extract a large amount of the desired sulfur-containing liquid, such as petroleum ether, and one which is ordinarily too miscible with the tar, such as acetone. By combining such materials in proper proportion, a solvent of the desired properties can be obtained. In some instances a multiple-stage extraction operation with the same or with different solvents in each stage may be found desirable. Small amounts of benzene, thiophene, and water may be employed in any of the above solvents or combinations thereof as solubility modifiers. Thus, by proper selection of solvent operating temperature and number of extraction stages, an extract of the desired properties can be obtained.

Extraction of the aforementioned thiophene tars is generally carried out by contacting with one of the above solvents or mixtures thereof for a period of time sufficient to permit intimate mixing of the tar and solvent. Generally, the components are brought into contact and the mixture is thoroughly agitated for at least about 5 minutes. Longer mixing times may be employed, if desired, but usually agitation in excess of about 10 minutes will not be necessary. The resulting mixture is then allowed to settle for a period of time sufficient to permit the formation of two distinct layers to take place. This settling time will be dependent on the particular solvent employed, the temperature at which the extraction is performed, the ratio of solvent to tar and other variables of the extraction process. Under the usual conditions of extraction, however, a settling time of about 30 minutes has been found to be effective. The resulting extract and raffinate phases are then separated. The particular solvent employed is removed from the extract phase, preferably by distillation under reduced pressure (100 millimeters of mercury or less), and the solvent so removed is recovered in a condition suitable for use in further extraction operations.

The extraction may either be carried out as a single-stage operation or as a multiple-stage operation. The yield of extract is appreciably increased by employing the latter technique and, consequently, a two or three-stage extraction is preferred over a single-stage operation. An increase in temperature ordinarily decreases the number of stages necessary to obtain an equivalent amount of extract. Thus, it has been established that when acetonitrile is employed as solvent, the yield of extract of a two-stage extraction carried out at 50° C. is roughly equivalent to a three-stage extraction performed at 25° C. The temperature of extraction may range from about −20° C. to about 125° C., preference being accorded temperatures of from about 15° C. to about 60° C. In particular, a temperature in the vicinity of about 25° C. to about 50° C. appeared to yield optimum results.

The extraction operation will ordinarily be carried out at atmospheric pressure, although higher pressures may be employed if desired. In some instances the use of pressure will be found necessary, particularly where the extraction is carried out at the more elevated temperatures approaching the boiling point of the particular solvent used. The volume ratio of solvent to tar employed will depend on the particular conditions under which extraction is effected and on the particular solvent used; however, the aforesaid ratio will generally be between about 0.5 and about 3, and preferably between about 1.5 and about 2.5. Substantially all of the solvent used can be recovered by distillation of the resultant extract phase and be recycled for further extraction, being supplemented by small additions of fresh solvent.

Apparatus suitable for effecting the extraction and subsequent recovery of solvent is shown in the accompanying drawing, wherein tar is supplied through conduit 1 to the upper portion of contacting vessel 2. Solvent is furnished through conduit 3 to the lower portion of said vessel. The solvent stream and tar stream flow countercurrent to one another, thereby effecting the selective extraction of desirable sulfur compounds from said tar. The heavier raffinate phase is withdrawn from the bottom of the contactor through outlet 4. The extract phase is removed from the top of the contactor through outlet 5 and is conducted through conduit 6 to preheater 7 just prior to entering tower 8, where the low boiling solvent is flashed off and passes overhead as vapor through outlet 9. The solvent vapor is condensed upon passing through condenser 10 and is then recycled through conduit 11 to supplement the stream of solvent being supplied to vessel 2. The extract accumulating in the bottom of tower 8 is removed through outlet 12 and contains the desirable sulfur compounds of this invention.

In an extraction process of the type described above, where the exact amount of desired product present in the initial tar charge cannot be determined easily, some difficulty is encountered in establishing the degree of separation of the desired component. The general criteria of separation employed herein, which have been found to be of particular value in ascertaining the degree of separation, are two physical properties of the charge, resulting extract and raffinate, respectively; namely, the average molecular weight and specific gravity. An examination of these properties shows that a definite change has been accomplished by the extraction process.

The following examples will serve to illustrate the nature of the invention without limiting the same:

EXAMPLE 1

A mixture containing 30 per cent by volume of 1,3-butadiene and 70 per cent by volume of normal butane was charged into a preheater at the rate of 35 grams per minute and heated to a temperature of 1100° F. Sulfur was charged to a separate preheater at a rate of 28 grams per minute and heated to a temperature of 1100° F. The two streams were sent through a mixing nozzle and thence through a baffled tube reactor of 50 cubic centimeters volume, constructed of 27 per cent chromium stainless steel, maintained at a temperature of 1300° F. The reaction product was quenched with a water spray, passed through a small Cottrell precipitator to remove tar mist and scrubbed through a hot countercurrent caustic tower. Liquid product was condensed and separated in a water cooler and ice trap, and the residual gas metered. Forty-nine per cent of the hydrocarbon material charged was converted to tar and liquid product. Fractionation of a portion of the stabilized (i. e., after removal of C4-hydrocarbons and lighter constituents) liquid product showed the following composition:

|  | Per cent |
|---|---|
| Carbon disulfide | 9.0 |
| Thiophene | 80.5 |
| Residue (mostly thiophene) | 10.5 |

Thiophene tar, such as the tar obtained according to the above described procedure, was found to have the following characteristics:

| | |
|---|---|
| Average weight per cent sulfur | 56.3 |
| Average molecular weight | 281 |
| Specific gravity 85°/60° F | 1.460 |
| Weight per cent insoluble in benzene | 7.5 |
| Weight per cent free sulfur | 0.09 |
| Weight per cent sulfur as SH | nil |
| Viscosity (S. U. V. at 210° F.) | 46 |

Two hundred sixteen parts by weight of this tar were mixed with 233 parts by weight of acetonitrile. The mixture was agitated for 10 minutes at a temperature of 50° C. The resulting immiscible phases were allowed to settle for 30 minutes and then the extract and raffinate phases were separated. The raffinate, amounting to 140 parts by weight, was further treated with 156 parts of fresh acetonitrile at 50° C. for a period of 10 minutes and phases were again allowed to settle for 30 minutes and then separated. The acetonitrile was stripped from each of the extract phases under reduced pressure (100 millimeters of mercury or less.) The yield of extract resulting from the first stage was 72 parts by weight and the yield from the second stage was 41 parts by weight. The total yield of extract, accordingly, was 113 parts by weight, representing a total extract of 52.4 per cent, based on the weight of the tar charged. Ninety-seven per cent of the acetonitrile used was recovered in a condition suitable for further extraction.

The properties of the extract and raffinate phases are summarized below:

| | Extract Properties | Raffinate Properties |
|---|---|---|
| Average Per Cent Sulfur | 57.6 | 55.0 |
| Average Molecular Weight | 172 | |
| Specific Gravity 85°/60° F | 1.386 | 1.517 |

EXAMPLE 2

Two hundred sixteen parts by weight of the thiophene tar described in Example 1 were agitated with 233 parts by weight of acetonitrile for a period of 10 minutes at a temperature of 22° C. The phases were allowed to settle for 30 minutes and then were separated. The raffinate, amounting to 166 parts by weight, was again contacted with 187 parts of fresh acetonitrile for 10 minutes at 22° C. and allowed to settle for 30 minutes. After separation of the phases, the raffinate, amounting to 117 parts by weight, was contacted for the third time with 132 parts of acetonitrile under the same conditions, allowed to settle, and separated. The acetonitrile was stripped from the extract phases separately under vacuum and the extracts were then combined to yield 116 parts by weight, representing a total extract of 53.7 per cent by weight, based on the amount of tar charged. The composited extract combined 57.7 per cent sulfur and had an average molecular weight of 171. Acetonitrile recovery was 95 per cent.

Fractionation of the total extract obtained under vacuum (5.0 millimeters of mercury) gave the following data:

*Distillation of extract*

[Weight percent of tar]

| B. P. 170–195° C. | B. P. 200–240° C. | B. P. 240–290° C. | Residue | Loss | Total |
|---|---|---|---|---|---|
| 8.0 | 4.4 | 25.7 | 13.3 | 2.6 | 54 |

The fraction boiling between 170 and 195° C. was redistilled under atmospheric pressure in a ten-plate helical grid glass column. The overhead boiled at 170–171° C. The resulting product was thiophenethiol as shown by the following analyses:

|  | Compound Boiling Between 170-171° C. | Theoretical |
|---|---|---|
| Percent Sulfur | 54.38 | 55.2 |
| Percent Carbon | 42.16 | 41.3 |
| Percent Hydrogen | 3.46 | 3.5 |
| Percent Sulfur as SH | 26.08 | 27.6 |
| Molecular Weight | 115 | 116 |

The fraction boiling between 200–240° C. was a deep red liquid containing 53.6 per cent of sulfur and having an average molecular weight of 141. The fraction boiling between 240–290° C. was also a red oil and had a sulfur content of 59.6 per cent and a molecular weight of 145. These compounds were very sensitive to heat and even under vacuum decomposed when exposed to heat.

EXAMPLE 3

Two hundred ninety parts by weight of the thiophene tar described in Example 1 were agitated with 316 parts by weight of methanol for a period of 10 minutes at room temperature. The mixture was allowed to settle for 30 minutes and the phases were then separated. The raffinate, amounting to 263 parts by weight, was again treated with 285 parts of methanol. The mixture was allowed to settle and the phases again separated. The raffinate from the second extraction, amounting to 233 parts by weight, was agitated a third time with 245 parts of methanol, allowed to settle, and the phases separated. The methanol was stripped off from each of the extract phases under vacuum to give a total yield of extract of 83 parts by weight, representing a yield of 28.6 per cent by weight, based on the weight of the tar charged.

The properties and analyses of the resultant extract and raffinate phases were as follows:

|  | Specific Gravity 85/60° F. | Average Wt. Percent Sulfur | Average Molecular Weight | Wt. percent Free Sulfur | Wt. Percent Sulfur as SH |
|---|---|---|---|---|---|
| Initial Tar | 1.460 | 56.3 | 281 | .09 | nil |
| Extract | 1.414 | 58.3 | 197 |  | .006 |
| Raffinate | 1.487 | 56.0 |  |  |  |

EXAMPLE 4

One hundred forty-five parts by weight of the thiophene tar described in Example 1 were agitated with 210 parts by weight of glacial acetic acid for a period of 10 minutes at a temperature of 28° C. The mixture was allowed to settle for 30 minutes and the phases were then separated. The raffinate was again treated with fresh glacial acetic acid in a ratio of 2 to 1 by volume of solvent. The phases were again separated and the raffinate was treated for the third time with fresh glacial acetic acid. The mixture was allowed to settle and the extract and raffinate phases separated. The glacial acetic acid solvent was stripped from the extract phases under vacuum and the extracts were composited. The total extract was then water-washed to remove residual acetic acid. The remaining traces of water were then removed by azeotropic distillation with acetronitrile. The total extract amounted to 51 parts by weight, representing a yield of 35.2 per cent by weight, based on the weight of the tar charged.

The properties and analyses of the resultant extract and raffinate phases were as follows:

|  | Specific Gravity 85/60° F. | Average Wt. Percent Sulfur | Average Molecular Weight | Wt. percent Free Sulfur | Wt. Percent Sulfur as SH |
|---|---|---|---|---|---|
| Initial Tar | 1.460 | 56.3 | 281 | .09 | nil |
| Extract | 1.388 | 56.3 | 209 | .09 | .006 |
| Raffinate |  | 55.3 |  |  |  |

EXAMPLE 5

One hundred forty-five parts by weight of the thiophene tar described in Example 1 and one hundred twenty-seven parts by weight of petroleum ether were agitated for a period of 10 minutes at room temperature. The mixture was then allowed to settle for 30 minutes and the phases were separated. The raffinate was again treated with one hundred twenty-seven parts of petroleum ether. The mixture was again allowed to settle for 30 minutes and separated. The raffinate was then treated for the third time with one hundred twenty-seven parts of petroleum ether and the mixture was allowed to settle and then separated. The solvent of petroleum ether was stripped off of each of the extract phases at atmospheric pressure initially and finally under reduced pressure. The yield of total extract was 21.0 parts by weight, representing a yield of 14.5 per cent, based on the weight of tar charged.

The properties and analyses of the resultant extract and raffinate phases were as follows:

|  | Specific Gravity 85/60° F. | Average Wt. Percent Sulfur | Average Molecular Weight | Wt. Percent Sulfur as SH |
|---|---|---|---|---|
| Initial Tar | 1.460 | 56.3 | 281 | nil |
| Extract | 1.363 | 54.3 | 236 | nil |
| Raffinate | 1.491 | 57.2 |  |  |

EXAMPLE 6

Two hundred ninety parts by weight of the thiophene tar described in Example 1 and two hundred seventy-four parts by weight of normal heptane were agitated for a period of 10 minutes at room temperature. The mixture was then allowed to settle for 30 minutes and the phases were separated. The raffinate, amounting to 270 parts by weight was again treated with 253 parts of normal heptane. After agitating for 10 minutes, the mixture was settled for 30 minutes and the phases separated. The raffinate from the second stage, amounting to 247 parts by weight, was contacted for the third time with 233 parts of normal heptane and allowed to settle for 30 minutes, and the phases separated.

The solvent from the extract phases was stripped off under reduced pressures. The total yield of extract was 52 parts by weight, representing a yield of 17.8 per cent, based on the weight of the tar charged. The physical properties and chemical analyses of the raffinate and extract are listed in the following table:

|  | Specific Gravity 85/60° F. | Average Wt. Percent Sulfur | Average Molecular Weight | Wt. percent Free Sulfur | Wt. Percent Sulfur as SH |
|---|---|---|---|---|---|
| Initial Tar | 1.460 | 56.3 | 281 | ---- | nil |
| Extract | 1.356 | 52.0 | 225 | 0.33 | nil |
| Raffinate | 1.482 | 58.1 | ---- | ---- | ---- |

EXAMPLE 7

Eight hundred thirty-four grams of isopentane were charged into a preheater at the rate of 40 grams per minute and heated to a temperature of 1080° F. Five hundred eight-three grams of sulfur were charged to a separate preheater at a rate of 28 grams per minute and heated to a temperature of 1080° F. The two streams were sent through a mixing nozzle and then through a baffled tube reactor of 50 cubic centimeters volume, constructed of 27 per cent chromium stainless steel, maintained at a temperature of 1200° F. The reaction product was quenched with a water spray, passed through a small Cottrell precipitator to remove tar mist, and scrubbed through a hot countercurrent caustic tower. The light product was cooled, condensed, and separated in a water cooler and ice trap. Seven hundred fifty-three grams of liquid were recovered. Fractionation of the liquid through a 15 theoretical-plate column gave 88 grams of a product having a boiling range of 107–115° C. Physical measurements and chemical tests established this fraction to be methyl thiophene. Along with methyl thiophene, there was obtained an approximately equal quantity of tar. This tar was characterized by the following properties:

Average weight percent sulfur _____ 55.7
Average molecular weight _____ 310
Specific gravity 85/60° F. _____ 1.484
Weight percent insoluble in benzene ____ 8.0

Two hundred ninety-three parts by weight of this tar were mixed with 312 parts by weight of acetonitrile. The mixture was agitated for 10 minutes at room temperature. The resulting immiscible phases were allowed to settle for 30 minutes and the phases were then separated. The raffinate, amounting to 241 parts by weight, was further treated with 254 parts of acetonitrile for a period of 10 minutes and phases were again allowed to separate for 30 minutes and then separated. The raffinate, amounting to 210 parts by weight, was treated for the third time with 218 parts by weight of acetonitrile under similar conditions, allowed to settle, and the phases separated.

The acetonitrile was stripped from each extract phase under vacuum. The yield of extract was 82 parts by weight, representing a yield of 28 per cent, based on the weight of tar charged. Acetonitrile recovery was 94 per cent. The properties of the resultant extract and raffinate phases were as follows:

|  | Extract | Raffinate |
|---|---|---|
| Average Per Cent Sulfur | 51.4 | ---- |
| Average Molecular Weight | 184 | ---- |
| Specific Gravity 85/60° F | 1.348 | 1.507 |

EXAMPLE 8

Two hundred twenty-three parts by weight of the methyl thiophene tar described in Example 7 were agitated with two hundred thirty-three parts by weight of acetonitrile for a period of 10 minutes at a temperature of 50° C. The mixture was allowed to settle for 30 minutes and the phases were separated. The raffinate, amounting to 183 parts by weight, was again contacted with 195 parts of acetonitrile, allowed to settle, and the phases separated.

The acetonitrile was stripped from each extract phase under vacuum. The yield of resulting extract was 62 parts by weight, representing a yield of 27.8 per cent, based on the weight of tar charged. Acetonitrile recovery was 98 per cent. The properties of the resultant extract and raffinate phases were as follows:

|  | Extract | Raffinate |
|---|---|---|
| Average Per Cent Sulfur | 54.7 | 57.8 |
| Average Molecular Weight | 202 | ---- |
| Specific Gravity 85/60° F | 1.401 | 1.550 |

The extract may further be resolved into two fractions by vacuum distillation. From 65 to 69 per cent of the extract charged to the still was taken overhead as distillate. Two cuts were obtained; one cut having a boiling point range at atmospheric pressure of 250–320° C. was obtained in an amount representing 23.9 per cent by weight of the charge; the second cut had a boiling point range at atmospheric pressure of 320–375° C. and was obtained in an amount representing 44.8 per cent by weight of the charge. The first of the above cuts was a deep red liquid, whereas the second cut was a solid product. Neither of the cuts was soluble in caustic solutions but both were soluble in organic solvents and in oils. Analyses of the two cuts are given in the table below:

| Fraction | Boiling Point Range at 760 mm. | Wt. Per Cent Sulfur | Wt. Per Cent Carbon | Wt. Per Cent Hydrogen | Molecular Weight | Per Cent Sulfur as SH | Specific Gravity 85/60° F. |
|---|---|---|---|---|---|---|---|
| 1 | 250–320 | 51.3 | 44.96 | 3.79 | 141 | nil | 1.314 |
| 2 | 320–375 | 53.8 | 42.98 | 3.22 | 154 | nil | 1.374 |

From the above examples, it will be evident that thiophene tars can be separated by selective solvent-extraction into two phases, a raffinate phase and an extract phase. The latter phase, containing valuable sulfur compounds, may be employed as a jet fuel additive, accelerator in the rubber industry, flotation agent and peptizer. The sulfur compounds obtained in accordance with the present invention may also be used in the making of insecticides and as intermediates in the synthesis of a multitude of chemical compounds.

The resulting extract may, as indicated in Example 2, be subjected to fractionation under high vacuum, yielding valuable organic sulfur derivatives, such as thiophenethiol, which is useful as a mineral oil additive and in the manufacture of insecticides and pharmaceuticals. The compounds so obtained, however, are undoubtedly products formed during said fractionation, since the initial tar was found to be essentially free of mercaptan sulfur. The distillates resulting from fractionation of the above described extracts have been found to be valuable as additives in the stabilization of petroleum oil fractions, particularly in inhibiting the development of those undesirable products and properties such as acid and discoloration normally encountered under conditions of use. Thus, it is well known that motor oils, especially those refined by certain solvent-extraction methods tend to oxidize when submitted to high temperatures and to form products that are corrosive to metal bearings. This corrosive action may be quite severe with certain bearings, such as those having the corrosion susceptibility of cadmium-silver alloys, and may cause their failure within a comparatively short time. The following test was used to determine the corrosive action of a motor oil on an automobile rod bearing.

The oil used consisted of Pennsylvania neutral and residuum stocks separately refined by means of chlorex and then blended to give an S. A. E. 20 motor oil with a specific gravity of 0.872, a flash point of 435° F. and a Saybolt Universal viscosity of about 318 seconds at 100° F. The oil was tested by adding a section of a bearing containing a cadmium-silver alloy surface and weighing about 6 grams, and heating it to 175° C. for 22 hours while a stream of air was bubbled against the surface of the bearing. The loss in weight of the bearing during this treatment measures the amount of corrosion that has taken place. A sample of oil containing varying amounts of the distillate, boiling in the range of 290–390° C., obtained from the extract of Example 7, was run at the same time as a sample of the straight oil, and the loss in weight of the bearing section in the inhibited oil can thus be compared directly with the loss in the uninhibited oil. The results obtained in this test are set forth in the following table:

| Concentration of Distillate in Oil | Mg. Loss in Weight |
|---|---|
| Blank | 23 |
| 1 per cent | Nil |
| ½ per cent | Nil |
| ¼ per cent | Nil |
| ⅛ per cent | Nil |

From the foregoing test results, it will be observed that distillates of the extract obtained in accordance with the present invention are effective stabilizing agents for petroleum oil fractions, even when employed in very minute proportion.

We claim:

1. A method for obtaining a valuable sulfur-containing liquid, comprising separately preheating sulfur and an aliphatic hydrocarbon of from 4 to 6 carbon atoms, having at least 4 carbon atoms in a straight chain, to temperatures such that combining said sulfur and said hydrocarbon will give a reaction mixture having a temperature between about 850° F. and about 1400° F., mixing the preheated sulfur and the preheated hydrocarbon, reacting said preheated sulfur with said preheated hydrocarbon at a reaction temperature varying between 850° F. and about 1400° F. to yield a mixture containing a tar, immediately reducing the temperature of the mixture containing said tar to a temperature of less than 850° F., separating the tar from said mixture, contacting the tar with a low boiling organic solvent selected from the group consisting of aliphatic alcohols of from 1 to 4 carbon atoms, aliphatic paraffinic hydrocarbons of from 3 to 8 carbon atoms, aliphatic nitriles of from 2 to 4 carbon atoms, petroleum ether, glacial acetic acid, nitromethane, tertiary-butyl mercaptan, dioxane, acetone, and diethyl carbonate at a temperature of between about −20° C. and about 125° C. for a period of time sufficient to permit intimate mixing of the tar and solvent, the volume ratio of solvent to tar being between about 0.5 and about 3, allowing the resultant mixture to settle, forming two distinct phases, separating the resulting extract and raffinate phases and thereafter removing solvent from said extract phase to yield the aforesaid sulfur-containing liquid.

2. A method for obtaining a valuable sulfur-containing liquid, comprising separately preheating sulfur and an aliphatic hydrocarbon of from 4 to 6 carbon atoms, having at least 4 carbon atoms in a straight chain, to temperatures such that combining said sulfur and said hydrocarbon will give a reaction mixture having a temperature between about 850° F. and about 1400° F., mixing the preheated sulfur and the preheated hydrocarbon, reacting said preheated sulfur with said preheated hydrocarbon at a reaction temperature varying between 850° F. and about 1400° F. to yield a mixture containing a tar, immediately reducing the temperature of the mixture containing said tar to a temperature of less than 850° F., separating the tar from said mixture, contacting the tar with an aliphatic nitrile of from 2 to 4 carbon atoms at a temperature of between −20° C. and about 125° C. for a period of time sufficient to permit intimate mixing of the tar and solvent, the volume ratio of solvent to tar being between about 0.5 and about 3, allowing the resultant mixture to settle, forming two distinct phases, separating the resulting extract and raffinate phases and thereafter removing solvent from said extract phase to yield the aforesaid sulfur-containing liquid.

3. A method for obtaining a valuable sulfur-containing liquid, comprising separately preheating sulfur and an aliphatic hydrocarbon of from 4 to 6 carbon atoms, having at least 4 carbon atoms in a straight chain, to temperatures such that combining said sulfur and said hydrocarbon will give a reaction mixture having a temperature between about 850° F. and about 1400° F., mixing the preheated sulfur and the preheated hydrocarbon, reacting said preheated sulfur with said preheated hydrocarbon at a reaction temperature varying between 850° F. and about 1400° F. to yield a mixture containing a tar, immediately reducing the temperature of the mixture containing said tar to a temperature of less than 850° F., separating the tar from said mixture, contacting the tar with a paraffinic hydrocarbon of from 3 to 8 carbon atoms at a temperature of between −20° C. and about 125° C. for a period of time sufficient to permit intimate mixing of the tar and solvent, the volume ratio of solvent to tar being between about 0.5 and about 3, allowing the resultant mixture to settle, forming two distinct phases, separating the resulting extract and raffinate phases and thereafter removing solvent from said extract phase to yield the aforesaid sulfur-containing liquid.

4. A method for obtaining a valuable sulfur-containing liquid, comprising separately preheating sulfur and an aliphatic hydrocarbon of from 4 to 6 carbon atoms, having at least 4 carbon atoms in a straight chain, to temperatures such that combining said sulfur and said hydrocarbon will give a reaction mixture having a temperature between about 850° F. and about 1400° F., mixing the preheated sulfur and the preheated hydrocarbon, reacting said preheated sulfur with said preheated hydrocarbon at a reaction temperature varying between 850° F. and about 1400° F. to yield a mixture containing a tar, immediately reducing the temperature of the mixture containing said tar to a temperature of less than 850° F., separating the tar from said mixture, contacting the tar with an aliphatic alcohol of from 1 to 4 carbon atoms at a temperature of between −20° C. and about 125° C. for a period of time sufficient to permit intimate mixing of the tar and solvent, the volume ratio of solvent to tar being between about 0.5 and about 3, allowing the resultant mixture to settle, forming two distinct phases, separating the resulting extract and raffinate phases and thereafter removing solvent from said extract phase to yield the aforesaid sulfur-containing liquid.

5. A method for obtaining a valuable sulfur-containing liquid, comprising separately preheating sulfur and an aliphatic hydrocarbon of from 4 to 6 carbon atoms, having at least 4 carbon atoms in a straight chain, to temperatures such that combining said sulfur and said hydrocarbon will give a reaction mixture having a temperature between about 850° F. and about 1400° F., mixing the preheated sulfur and the preheated hydrocarbon, reacting said preheated sulfur with said preheated hydrocarbon at a reaction temperature varying between 850° F. and about 1400° F. to yield a mixture containing a tar, immediately reducing the temperature of the mixture containing said tar to a temperature of less than 850° F., separating the tar from said mixture, contacting the tar with acetonitrile at a temperature between about −20° C. and about 125° C. for a period of time sufficient to permit intimate mixing of the tar and acetonitrile, the volume ratio of acetonitrile to tar being between about 0.5 and about 3, allowing the resultant mixture to settle, forming two distinct phases, separating the resulting extract and raffinate phases and thereafter removing acetonitrile from said extract phase to yield the aforesaid sulfur-containing liquid.

6. A method for obtaining a valuable sulfur-containing liquid, comprising separately preheating sulfur and an aliphatic hydrocarbon of from 4 to 6 carbon atoms, having at least 4 carbon atoms in a straight chain, to temperatures such that combining said sulfur and said hydrocarbon will give a reaction mixture having a temperature between about 850° F. and about 1400° F., mixing the preheated sulfur and the preheated hydrocarbon, reacting said preheated sulfur with said preheated hydrocarbon at a reaction temperature varying between 850° F. and about 1400° F. to yield a mixture containing a tar, immediately reducing the temperature of the mixture containing said tar to a temperature of less than 850° F., separating the tar from said mixture, contacting the tar with petroleum ether at a temperature of between about −20° C. and about 125° C. for a period of time sufficient to permit intimate mixing of the tar and petroleum ether, the volume ratio of ether to tar being between about 0.5 and about 3, allowing the resultant mixture to settle, forming two distinct phases, separating the resulting extract and raffinate phases and thereafter removing petroleum ether from said extract phase to yield the aforesaid sulfur-containing liquid.

7. A method for obtaining a valuable sulfur-containing liquid, comprising separately preheating sulfur and an aliphatic hydrocarbon of from 4 to 6 carbon atoms, having at least 4 carbon atoms in a straight chain, to temperatures such that combining said sulfur and said hydrocarbon will give a reaction mixture having a temperature between about 850° F. and about 1400° F., mixing the preheated sulfur and the preheated hydrocarbon, reacting said preheated sulfur with said preheated hydrocarbon at a reaction temperature varying between 850° F. and about 1400° F. to yield a mixture containing a tar, immediately reducing the temperature of the mixture containing said tar to a temperature of less than 850° F., separating the tar from said mixture, contacting the tar with methanol at a temperature of between about −20° C. and about 125° C. for a period of time sufficient to permit intimate mixing of the tar and methanol, the volume ratio of methanol to tar being between about 0.5 and about 3, allowing the resultant mixture to settle, forming two distinct phases, separating the resulting extract and raffinate phases and thereafter removing methanol from said extract phase to yield the aforesaid sulfur-containing liquid.

8. A continuous method for obtaining a valuable sulfur-containing liquid, comprising separately preheating sulfur and an aliphatic hydrocarbon of from 4 to 6 carbon atoms, having at least 4 carbon atoms in a straight chain, to temperatures such that combining said sulfur and said hydrocarbon will give a reaction mixture having a temperature between about 850° F. and about 1400° F., mixing the preheated sulfur and the preheated hydrocarbon, reacting said preheated sulfur with said preheated hydrocarbon at a reaction temperature varying between 850° F. and about 1400° F. to yield a mixture containing a tar, immediately reducing the temperature of the mixture containing said tar to a temperature of less than 850° F., separating the tar from said mixture, contacting the tar with a low boiling organic solvent selected from the group consisting of aliphatic alcohols of from 1 to 4 carbon atoms, aliphatic paraffinic hydrocarbons of from 3 to 8 carbon atoms, aliphatic nitriles of from 2 to 4 carbon atoms, petroleum ether, glacial acetic acid, nitromethane, tertiary-butyl mercaptan, dioxane, acetone, and dietheyl carbonate at a temperature of between about −20° C. and about 125° C. for a period of time sufficient to permit intimate mixing of the tar and solvent, the volume ratio of solvent to tar being between about 0.5 and about 3, allowing the resultant mixture to settle, forming two distinct phases, separating the resulting extract and raffinate phases, recovering solvent from said phases and recycling said recovered solvent to contact with additional tar.

9. A continuous method for obtaining a valuable sulfur-containing liquid, comprising separately preheating sulfur and an aliphatic hydrocarbon of from 4 to 6 carbon atoms, having at least 4 carbon atoms in a straight chain, to temperatures such that combining said sulfur and said hydrocarbon will give a reaction mixture at a temperature between about 850° F. and about 1400° F., mixing the preheated sulfur and the preheated hydrocarbon, reacting said preheated sulfur with said preheated hydrocarbon at a reaction temperature varying between 850° F. and about 1400° F. to yield a mixture containing a tar, immediately reducing the temperature of the mixture containing said tar to a temperature of less than 850° F., separating the tar from said mixture, contacting the tar with an aliphatic nitrile of from 2 to 4 carbon atoms at a temperature of between about −20° C. and about 125° C. for a period of time sufficient to permit intimate mixing of the tar and nitrile, the volume ratio of nitrile being between about 0.5 and about 3, allowing the resultant mixture to settle, forming two distinct phases, separating the resulting extract and raffinate phases, recovering solvent from said phases and recycling said recovered solvent to contact with additional tar.

10. A continuous method for obtaining a valuable sulfur-containing liquid, comprising separately preheating sulfur and an aliphatic hydrocarbon of from 4 to 6 carbon atoms, having at least 4 carbon atoms in a straight chain, to temperatures such that combining said sulfur and said hydrocarbon will give a reaction mixture at a temperature between about 850° F. and about 1400° F., mixing the preheated sulfur and the preheated hydrocarbon, reacting said preheated sulfur with said preheated hydrocarbon at a reaction temperature varying between 850° F. and about 1400° F. to yield a mixture containing a tar, immediately reducing the temperature of the mixture containing said tar to a temperature of less than 850° F., separating the tar from said mixture, contacting the tar with a paraffinic hydrocarbon of from 3 to 8 carbon atoms at a temperature of between about −20° C. and about 125° C. for a period of time sufficient to permit intimate mixing of the tar and paraffinic hydrocarbon, the volume ratio of hydrocarbon to tar being between about 0.5 and about 3, allowing the resultant mixture to settle, forming two distinct phases, separating the resulting extract and raffinate phases, recovering solvent from said phases and recycling said recovered solvent to contact with additional tar.

11. A continuous method for obtaining a valuable sulfur-containing liquid, comprising separately preheating sulfur and an aliphatic hydrocarbon of from 4 to 6 carbon atoms, having at least 4 carbon atoms in a straight chain, to temperatures such that combining said sulfur and said hydrocarbon will give a reaction mixture at a temperature between about 850° F. and about 1400° F., mixing the preheated sulfur and the preheated hydrocarbon, reacting said preheated sulfur with said preheated hydrocarbon at a reaction temperature varying between 850° F. and about 1400° F. to yield a mixture containing a tar, immediately reducing the temperature of the mixture containing said tar to a temperature of less than 850° F., separating the tar from said mixture, contacting the tar with an aliphatic alcohol of from 1 to 4 carbon atoms at a temperature of between about −20° C. and about 125° C. for a period of time sufficient to permit intimate mixing of the tar and aliphatic alcohol, the volume ratio of alcohol to tar being between about 0.5 and about 3, allowing the resultant mixture to settle, forming two distinct phases, separating the resulting extract and raffinate phases, recovering solvent from said phases and recycling said recovered solvent to contact with additional tar.

12. A continuous method for obtaining a valuable sulfur-containing liquid, comprising separately preheating sulfur and an aliphatic hydrocarbon of from 4 to 6 carbon atoms, having at least 4 carbon atoms in a straight chain, to temperatures such that combining said sulfur and said hydrocarbon will give a reaction mixture at a temperature between about 850° F. and about 1400° F., mixing the preheated sulfur and the preheated hydrocarbon, reacting said preheated sulfur with said preheated hydrocarbon at a reaction temperature varying between 850° F. and about 1400° F. to yield a mixture containing a tar, immediately reducing the temperature of the mixture containing said tar to a temperature of less than 850° F., separating the tar from said mixture, contacting the tar with acetonitrile at a temperature of between about −20° C. and about 125° C. for a period of time sufficient to permit intimate mixing of the tar and acetonitrile, the volume ratio of acetonitrile to tar being between about 0.5 and about 3, allowing the resultant mixture to settle, forming two distinct phases, separating the resulting extract and raffinate phases, recovering solvent from said phases and recycling said recovered solvent to contact with additional tar.

13. A continuous method for obtaining a valuable sulfur-containing liquid, comprising separately preheating sulfur and an aliphatic hydrocarbon of from 4 to 6 carbon atoms, having at least 4 carbon atoms in a straight chain, to temperatures such that combining said sulfur and said hydrocarbon will give a reaction mixture at a temperature between about 850° F. and about 1400° F., mixing the preheated sulfur and the preheated hydrocarbon, reacting said preheated sulfur with said preheated hydrocarbon at a reaction temperature varying between 850° F. and about 1400° F. to yield a mixture containing a tar, immediately reducing the temperature of the mixture containing said tar to a temperature of less than 850° F., separating the tar from said mixture, contacting the tar with petroleum ether at a temperature of between about −20° C. and about 125° C. for a period of time sufficient to permit intimate mixing of the tar and petroleum ether, the volume ratio of petroleum ether to tar being between about 0.5 and about 3, allowing the resultant mixture to settle, forming two distinct phases, separating the resulting extract and raffinate phases, recovering solvent from said phases and recycling said recovered solvent to contact with additional tar.

14. A continuous method for obtaining a valuable sulfur-containing liquid, comprising separately preheating sulfur and an aliphatic hydrocarbon of from 4 to 6 carbon atoms, having at least 4 carbon atoms in a straight chain, to temperatures such that combining said sulfur and said hydrocarbon will give a reaction mixture at a temperature between about 850° F. and about 1400° F., mixing the preheated sulfur and the preheated hydrocarbon, reacting said preheated sulfur with said preheated hydrocarbon at a reaction temperature varying between 850° F. and about 1400° F. to yield a mixture containing a tar, immediately reducing the temperature of the mixture containing said tar to a temperature of less than 850° F, separating the tar from said mixture, contacting the tar with methanol at a temperature of between about −20° C. and about 125° C. for a period of time sufficient to permit intimate mixing of the tar and methanol, the volume ratio of methanol to tar being between about 0.5 and about 3, allowing the resultant mixture to settle, forming two distinct phases, separating the resulting extract and raffinate phases, recovering solvent from said phases and recycling said recovered solvent to contact with additional tar.

15. A sulfur-containing liquid having an average weight sulfur content of between about 50 and about 60 per cent, obtained by contacting a thiophene tar with a low boiling organic solvent selected from the group consisting of aliphatic alcohols of from 1 to 4 carbon atoms, aliphatic paraffinic hydrocarbons of from 3 to 8 carbon atoms, aliphatic nitriles of from 2 to 4 carbon atoms, petroleum ether, glacial acetic acid, nitromethane, tertiary-butyl mercaptan, dioxane, acetone, and diethyl carbonate at a temperature of between about −20° C. and about 125° C. for a period of time sufficient to permit intimate mixing of the tar and solvent, the volume ratio of solvent to tar being between about 0.5 and about 3, thereafter allowing the resultant mixture to settle, forming two distinct phases, separating the resulting extract and raffinate phases, and thereafter removing solvent from said extract phase, the aforesaid tar having been obtained by separately preheating sulfur and an aliphatic hydrocarbon of from 4 to 6 carbon atoms, having at least 4 carbon atoms in a straight chain, to temperatures such that combining said sulfur and said hydrocarbon would give a reaction mixture having a temperature varying between about 850° F. and about 1400° F., mixing the preheated sulfur and the preheated hydrocarbon, reacting said preheated sulfur with said preheated hydrocarbon at a reaction temperature varying between 850° F. and about 1400° F. to yield a mixture containing said tar, immediately reducing the temperature of the mixture containing said tar to a temperature of less than 850° F. and separating the tar from said mixture.

16. A method for obtaining a valuable sulfur-containing liquid, comprising separately preheating sulfur and an aliphatic hydrocarbon of from 4 to 6 carbon atoms, having at least 4 carbon atoms in a straight chain, to temperatures such that combining said sulfur and said hydrocarbon will give a reaction mixture having a temperature between about 850° F. and about 1400° F., mixing the preheated sulfur and the preheated hydrocarbon, reacting said preheated sulfur with said preheated hydrocarbon at a reaction temperature varying between 850° F. and about 1400° F. to yield a mixture containing a tar, immediately reducing the temperature of the mixture containing said tar to a temperature of less than 850° F., separating the tar from said mixture, contacting the tar with glacial acetic acid at a temperature of between about −20° C. and about 125° C. for a period of time sufficient to permit intimate mixing of the tar and glacial acetic acid, the volume ratio of acetic acid to tar being between about 0.5 and about 3, allowing the resultant mixture to settle, forming two distinct phases, separating the resulting extract and raffinate phases, and thereafter removing acetic acid from said extract phase to yield the aforesaid sulfur-containing liquid.

17. A method for obtaining a valuable sulfur-containing liquid, comprising separately preheating sulfur and an aliphatic hydrocarbon of from 4 to 6 carbon atoms, having at least 4 carbon atoms in a straight chain, to temperatures such that combining said sulfur and said hydrocarbon will give a reaction mixture having a temperature between about 850° F. and about 1400° F., mixing the preheated sulfur and the preheated hydrocarbon, reacting said preheated sulfur with said preheated hydrocarbon at a reaction temperature varying between 850° F. and about 1400° F. to yield a mixture containing a tar, immediately reducing the temperature of the mixture containing said tar to a temperature of less than 850° F., separating the tar from said mixture, contacting the tar with normal heptane at a temperature of between about −20° C. and about 125° C. for a period of time sufficient to permit intimate mixing of the tar and normal heptane, the volume ratio of normal heptane to tar being between about 0.5 and about 3, allowing the resultant mixture to settle, forming two distinct phases, separating the resulting extract and raffinate phases, and thereafter removing normal heptane from said extract phase to yield the aforesaid sulfur-containing liquid.

18. A continuous method for obtaining a valuable sulfur-containing liquid, comprising separately preheating sulfur and an aliphatic hydrocarbon of from 4 to 6 carbon atoms, having at least 4 carbon atoms in a straight chain, to temperatures such that combining said sulfur and said hydrocarbon will give a reaction mixture at a temperature between about 850° F. and about 1400° F., mixing the preheated sulfur and the preheated hydrocarbon, reacting said preheated sulfur with said preheated hydrocarbon at a reaction temperature varying between 850° F. and about 1400° F. to yield a mixture containing a tar, immediately reducing the temperature of the mixture containing said tar to a temperature of less than 850° F., separating the tar from said mixture, contacting the tar with glacial acetic acid at a temperature of between about −20° C. and about 125° C. for a period of time sufficient to permit intimate mixing of the tar and glacial acetic acid, the volume ratio of acetic acid to tar being between about 0.5 and about 3, allowing the resultant mixture to settle, forming two distinct phases, separating the resulting extract and raffinate phases, recovering solvent from said phases and recycling said recovered solvent to contact with additional tar.

19. A continuous method for obtaining a valuable sulfur-containing liquid, comprising separately preheating sulfur and an aliphatic hydrocarbon of from 4 to 6 carbon atoms, having at least 4 carbon atoms in a straight chain, to temperatures such that combining said sulfur and said hydrocarbon will give a reaction mixture at a temperature between about 850° F. and about 1400° F., mixing the preheated sulfur and the preheated hydrocarbon, reacting said preheated sulfur with said preheated hydrocarbon at a reaction temperature varying between 850° F. and about 1400° F. to yield a mixture containing a tar, immediately reducing the temperature of the mixture containing said tar to a temperature of less than 850° F., separating the tar from said mixture, contacting the tar with normal heptane at a temperature of between about −20° C. and about 125° C. for a period of time sufficient to permit intimate mixing of the tar and normal heptane, the volume ratio of normal heptane to tar being between about 0.5 and about 3, allowing the resultant mixture to settle, forming two distinct phases, separating the resulting extract and raffinate phases, recovering solvent from said phases and recycling said recovered solvent to contact with additional tar.

SIGMUND J. LUKASIEWICZ.
WILLIAM I. DENTON.

REFERENCES CITED

The following references are of record in the file of this patent:

UNITED STATES PATENTS

| Number | Name | Date |
|---|---|---|
| 2,167,439 | Kaufman | July 25, 1939 |
| 2,181,964 | Chittick | Dec. 5, 1939 |

OTHER REFERENCES

Sollmann: Manual of Pharmacology, Ed. 7 pp. 129–130, Saunders, Philadelphia, 1948.

Hagers: Handbuch der Pharmazeutischen Praxis, vol. 2, p. 282, Springer, Berlin, 1927.